United States Patent [19]

Beausoleil

[11] 3,735,368

[45] May 22, 1973

[54] FULL CAPACITY MONOLITHIC MEMORY UTILIZING DEFECTIVE STORAGE CELLS

[75] Inventor: William F. Beausoleil, Poughkeepsie, N.Y.

[73] Assignee: International Business Machines Corporation, Armonk, N.Y.

[22] Filed: June 25, 1971

[21] Appl. No.: 156,637

[52] U.S. Cl. ........340/173 R, 340/172.5, 340/173 BB

[51] Int. Cl. ..............................................G11c 11/00

[58] Field of Search........................340/173 R, 172.5

[56] References Cited

UNITED STATES PATENTS

| | | | |
|---|---|---|---|
| 3,234,521 | 2/1966 | Weisbecker | 340/172.5 |
| 3,434,116 | 3/1969 | Anacker | 340/172.5 |
| 3,444,526 | 5/1969 | Fletcher | 340/172.5 |
| 3,588,830 | 6/1971 | Duda | 340/172.5 |

*Primary Examiner*—Terrell W. Fears
*Attorney*—Edward S. Gershunny

[57] ABSTRACT

A computer memory, most particularly a monolithic memory, may be constructed of components which contain defective bit cells. During the production process, the monolithic chips are sorted into groups in accordance with the chip sector which contains one or more defective cells. The chips are then mounted on memory cards, with all of the chips having a defect in a given chip sector being mounted on a corresponding card sector. The cards, each of which is produced in a substantially identical manner, are then assembled into a complete memory. The address wiring of the memory is provided in such a manner as to ensure that no given memory word, or defined group of bits within a memory word, contains within it more than one memory cell that is known or suspected to be defective. Means are also provided for deriving from the address of any given memory word the bit location within said word of a defective or suspicious bit. In one embodiment shown herein, the suspect bit is bypassed in favor of a redundant bit provided within the memory system. In another embodiment described herein, the suspect bit is utilized just as if it were a good bit, but, upon detection of an error, the suspect bit will be presumed to be in error.

17 Claims, 12 Drawing Figures

INVENTOR
WILLIAM F. BEAUSOLEIL

BY Edward S. Gershuny
ATTORNEY

FIG. 4

| C0 | C1 | C2 | C3 | C4 | C5 | C6 | C7 | C8 | C9 | C10 | C11 | C12 | C13 | C14 | C15 |
|---|---|---|---|---|---|---|---|---|---|---|---|---|---|---|---|
| A | $\bar{A}$ | A | $\bar{A}$ | A | $\bar{A}$ | A | $\bar{A}$ | A | $\bar{A}$ | A | $\bar{A}$ | A | $\bar{A}$ | A | $\bar{A}$ |
| B | B | $\bar{B}$ | $\bar{B}$ | B | B | $\bar{B}$ | $\bar{B}$ | B | B | $\bar{B}$ | $\bar{B}$ | B | B | $\bar{B}$ | $\bar{B}$ |
| C | C | C | C | $\bar{C}$ | $\bar{C}$ | $\bar{C}$ | $\bar{C}$ | C | C | C | C | $\bar{C}$ | $\bar{C}$ | $\bar{C}$ | $\bar{C}$ |
| D | D | D | D | D | D | D | D | $\bar{D}$ | $\bar{D}$ | $\bar{D}$ | $\bar{D}$ | $\bar{D}$ | $\bar{D}$ | $\bar{D}$ | $\bar{D}$ |

FIG. 5

| D C B A | C0 | C1 | C2 | C3 | C4 | C5 | C6 | C7 | C8 | C9 | C10 | C11 | C12 | C13 | C14 | C15 |
|---|---|---|---|---|---|---|---|---|---|---|---|---|---|---|---|---|
| 1 1 1 1 | 15 | 14 | 13 | 12 | 11 | 10 | 9 | 8 | 7 | 6 | 5 | 4 | 3 | 2 | 1 | 0 |
| 1 1 1 0 | 14 | 15 | 12 | 13 | 10 | 11 | 8 | 9 | 6 | 7 | 4 | 5 | 2 | 3 | 0 | 1 |
| 1 1 0 1 | 13 | 12 | 15 | 14 | 9 | 8 | 11 | 10 | 5 | 4 | 7 | 6 | 1 | 0 | 3 | 2 |
| 1 1 0 0 | 12 | 13 | 14 | 15 | 8 | 9 | 10 | 11 | 4 | 5 | 6 | 7 | 0 | 1 | 2 | 3 |
| 1 0 1 1 | 11 | 10 | 9 | 8 | 15 | 14 | 13 | 12 | 3 | 2 | 1 | 0 | 7 | 6 | 5 | 4 |
| 1 0 1 0 | 10 | 11 | 8 | 9 | 14 | 15 | 12 | 13 | 2 | 3 | 0 | 1 | 6 | 7 | 4 | 5 |
| 1 0 0 1 | 9 | 8 | 11 | 10 | 13 | 12 | 15 | 14 | 1 | 0 | 3 | 2 | 5 | 4 | 7 | 6 |
| 1 0 0 0 | 8 | 9 | 10 | 11 | 12 | 13 | 14 | 15 | 0 | 1 | 2 | 3 | 4 | 5 | 6 | 7 |
| 0 1 1 1 | 7 | 6 | 5 | 4 | 3 | 2 | 1 | 0 | 15 | 14 | 13 | 12 | 11 | 10 | 9 | 8 |
| 0 1 1 0 | 6 | 7 | 4 | 5 | 2 | 3 | 0 | 1 | 14 | 15 | 12 | 13 | 10 | 11 | 8 | 9 |
| 0 1 0 1 | 5 | 4 | 7 | 6 | 1 | 0 | 3 | 2 | 13 | 12 | 15 | 14 | 9 | 8 | 11 | 10 |
| 0 1 0 0 | 4 | 5 | 6 | 7 | 0 | 1 | 2 | 3 | 12 | 13 | 14 | 15 | 8 | 9 | 10 | 11 |
| 0 0 1 1 | 3 | 2 | 1 | 0 | 7 | 6 | 5 | 4 | 11 | 10 | 9 | 8 | 15 | 14 | 13 | 12 |
| 0 0 1 0 | 2 | 3 | 0 | 1 | 6 | 7 | 4 | 5 | 10 | 11 | 8 | 9 | 14 | 15 | 12 | 13 |
| 0 0 0 1 | 1 | 0 | 3 | 2 | 5 | 4 | 7 | 6 | 9 | 8 | 11 | 10 | 13 | 12 | 15 | 14 |
| 0 0 0 0 | 0 | 1 | 2 | 3 | 4 | 5 | 6 | 7 | 8 | 9 | 10 | 11 | 12 | 13 | 14 | 15 |

CHIP-SECTOR ADDRESS

FIG. 10

| C0 | C1 | C2 | C3 | C4 | C5 | C6 | C7 | R1 | C8 | C9 | C10 | C11 | C12 | C13 | C14 | C15 | R2 | C16 |
|---|---|---|---|---|---|---|---|---|---|---|---|---|---|---|---|---|---|---|
| 7 | 6 | 5 | 4 | 3 | 2 | 1 | 0 | 7 | 7 | 6 | 5 | 4 | 3 | 2 | 1 | 0 | 7 | 7 |
| 6 | 7 | 4 | 5 | 2 | 3 | 0 | 1 | 6 | 6 | 7 | 4 | 5 | 2 | 3 | 0 | 1 | 6 | 6 |
| 5 | 4 | 7 | 6 | 1 | 0 | 3 | 2 | 5 | 5 | 4 | 7 | 6 | 1 | 0 | 3 | 2 | 5 | 5 |
| 4 | 5 | 6 | 7 | 0 | 1 | 2 | 3 | 4 | 4 | 5 | 6 | 7 | 0 | 1 | 2 | 3 | 4 | 4 |
| 3 | 2 | 1 | 0 | 7 | 6 | 5 | 4 | 3 | 3 | 2 | 1 | 0 | 7 | 6 | 5 | 4 | 3 | 3 |
| 2 | 3 | 0 | 1 | 6 | 7 | 4 | 5 | 2 | 2 | 3 | 0 | 1 | 6 | 7 | 4 | 5 | 2 | 2 |
| 1 | 0 | 3 | 2 | 5 | 4 | 7 | 6 | 1 | 1 | 0 | 3 | 2 | 5 | 4 | 7 | 6 | 1 | 1 |
| 0 | 1 | 2 | 3 | 4 | 5 | 6 | 7 | 0 | 0 | 1 | 2 | 3 | 4 | 5 | 6 | 7 | 0 | 0 |

| | | | | | | | | | | | | | | | | | | |
|---|---|---|---|---|---|---|---|---|---|---|---|---|---|---|---|---|---|---|
| A | $\bar{A}$ | A | $\bar{A}$ | A | $\bar{A}$ | A | $\bar{A}$ | A | A | $\bar{A}$ | A | $\bar{A}$ | A | $\bar{A}$ | A | $\bar{A}$ | A | A |
| B | B | $\bar{B}$ | $\bar{B}$ | B | B | $\bar{B}$ | $\bar{B}$ | B | B | B | $\bar{B}$ | $\bar{B}$ | B | B | $\bar{B}$ | $\bar{B}$ | B | B |
| C | C | C | C | $\bar{C}$ | $\bar{C}$ | $\bar{C}$ | $\bar{C}$ | C | C | C | C | C | $\bar{C}$ | $\bar{C}$ | $\bar{C}$ | $\bar{C}$ | C | C |

FIG. 11

| C0 | C1 | C2 | C3 | C4 | C5 | R |
|---|---|---|---|---|---|---|
| ⑦ | ⑥ | 5 | 4 | 3 | 2 | 1 |
| ⑥ | ⑦ | 4 | 5 | 2 | 3 | 0 |
| 5 | 4 | ⑦ | ⑥ | 1 | 0 | 3 |
| 4 | 5 | ⑥ | ⑦ | 0 | 1 | 2 |
| 3 | 2 | 1 | 0 | ⑦ | ⑥ | 5 |
| 2 | 3 | 0 | 1 | ⑥ | ⑦ | 4 |
| 1 | 0 | 3 | 2 | 5 | 4 | ⑦ |
| 0 | 1 | 2 | 3 | 4 | 5 | ⑥ |

| | | | | | | | |
|---|---|---|---|---|---|---|---|
| A → | A | $\bar{A}$ | A | $\bar{A}$ | A | $\bar{A}$ | A |
| B → | B | B | $\bar{B}$ | $\bar{B}$ | B | B | $\bar{B}$ |
| C → | C | C | C | C | $\bar{C}$ | $\bar{C}$ | $\bar{C}$ |

FULL CAPACITY MONOLITHIC MEMORY UTILIZING DEFECTIVE STORAGE CELLS

INTRODUCTION

BACKGROUND OF THE INVENTION

This invention relates to data processing system storages and more particularly to a method and means for utilizing defective memory components that normally would be rejected in production.

In monolithic memories, a number of storage cells are formed on a single silicon wafer. The wafers are cut into a number of smaller units called chips. These chips are arranged on substrates and the substrates are packaged on integrated circuit modules. The integrated circuit modules are soldered into printed circuit cards to make up a basic component of a memory. In the production of monolithic chips, the yield of good chips from the silicon wafer may be low, especially in the first few years of production. For each perfect chip produced, there may be a number of chips that are almost perfect, having localized imperfections which render unusable only a single cell or a few closely associated cells. In U. S. Pat. application Ser. No. 76917 filed on Sept. 30, 1970 for W. F. Beausoleil there is described a method and apparatus in which defective chips are sorted during the production process, and chips having defective areas in similar locations are arranged in the same pattern in each array card. Logic is provided between the memory address register and the array card which translates each address to avoid the addressing of defective cells. In another Beausoleil application, Ser. No. 38220 filed May 18, 1970, an easily reconfigurable system is described. In that system, when a word is found to contain a number of errors which exceeds the correcting capability of the error correcting system, the memory may be readily reconfigured so that the bad bits are distributed more randomly throughout the memory, enabling the error correction circuitry to cope with the errors.

Each of the U.S. Pat. applications Ser. Nos. 38,220 and 76,917 referred to above is incorporated into this application by said reference.

OBJECTS OF THE INVENTION

It is a general object of this invention to provide an improved process for the manufacture of monolithic memories.

It is a more particular object of this invention to provide a monolithic memory which utilizes partially defective components and which utilizes all addressable memory locations.

Another object is to accomplish the above while providing a memory which is made up of a minimal number of field replaceable parts and which utilizes a minimal number of different manufacturing parts.

Yet another object of the invention is to provide a process for manufacture of monolithic memories which will require the least amount of redesign in presently existing processes.

Another object is to provide a memory wherein a given word contains, within a predefined group of bits, only one suspect bit and the word address will identify the suspect bit.

SUMMARY OF THE INVENTION

Briefly, the invention comprises a method and apparatus in which defective chips are sorted during the production process, and chips having defective areas in similar sections are all put in a corresponding section of an array card. Means are provided for identifying, for each word, by operating upon the word address, the bit which was read from (or written into) a defective chip section. In the preferred embodiments of the invention, part of the above is accomplished through an arrangement of "back-panel wiring" which ensures that no word will contain more than one bit from a defective chip section.

In a first embodiment of the invention, reading and writing of the defective chip section will be performed just as if those sections were perfect. Upon detection of an error that is not otherwise correctable, the bit which came from a defective chip section will be inverted and, if the error detection circuitry indicates that the data is now valid (or that the word now contains a correctable error) processing will continue. This first embodiment has the advantage that it is the least expensive implementation of the invention. The memory contains no extra redundancy (thereby reducing production costs) and all array cards are identical (thereby reducing manufacturing part number and inventory costs). It has the disadvantage that it does, to some small extent, reduce the error detection and/or correction capability of the memory system.

In a second embodiment of the invention, one or more redundant array cards are provided. In this case, a bit from a defective section of a chip will be bypassed in favor of a bit on one of the redundant cards. In the preferred version of this second embodiment, the redundant array cards are all populated exclusively by perfect chips. This second embodiment will generally be more expensive than the first embodiment. It contains redundant memory locations (thus increasing production costs) and preferably contains only perfect chips on the redundant cards (thus possibly increasing the cost of maintaining a parts inventory). However, it does have the advantage that there is no degradation in the system's error detection and/or correction capability. Also, it must be noted that even the second embodiment will generally be less expensive, in terms of both production costs and inventory costs, than known practical prior art systems.

The foregoing and other objects, features and advantages of the invention will be apparent from the following more particular description of preferred embodiments of the invention, as illustrated in the accompanying drawings.

DESCRIPTION OF THE DRAWINGS

FIG. 4 shows back-panel wiring in accordance with the invention;

FIG. 5 shows the logical effect of the altered back-panel wiring on chip-sector addresses;

FIG. 10 shows a third embodiment of the invention;

FIG. 11 shows a fourth embodiment of the invention.

DETAILED DESCRIPTION

Environment of the Invention

Figure 1:
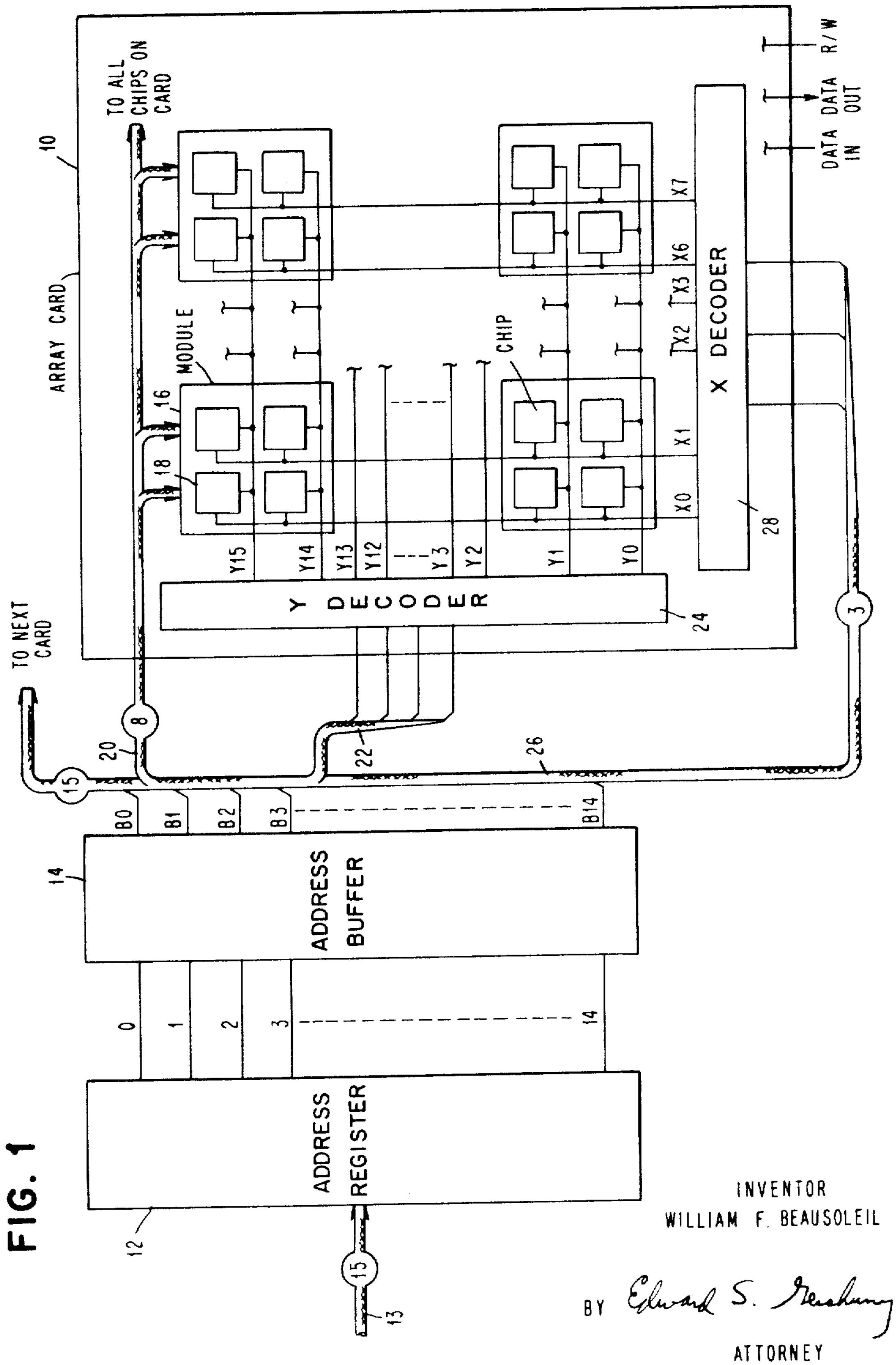
FIG. 1 is a block schematic diagram of a monolithic memory in which the invention is embodied.

Referring to FIG. 1, a monolithic memory in which the invention is embodied is shown. The memory is comprised of a plurality of array cards 10, each card representing one bit position of a word in a three dimensional memory. Only one array card is shown although a number of such cards is necessary depending on how many bit positions are in a full word. The memory is addressed by means of an address received in address register 12, from address bus 13, which address is re-powered by address buffer 14.

Each array card 10 is comprised of a plurality of modules 16. Each module is comprises of four chips. (A single chip is shown in more detail in FIG. 2.) The bit addresses on a chip are arbitrarily divided into logical sectors and the binary address bits which address these sectors are called the sector address.

The output 20 from the address buffer 14 is connected to all chips throughout the memory and is decoded to select a single bit cell on a chip, as is more fully described with reference to FIG. 2.

The output 22 of the address buffer 14 drives a Y decoder 24 and the output 26 from the address buffer drives an X decoder 28 on the array card. The decoded outputs of the Y decoder and the X decoder energize a single chip at the intersection of the energized outputs.

Figure 2:
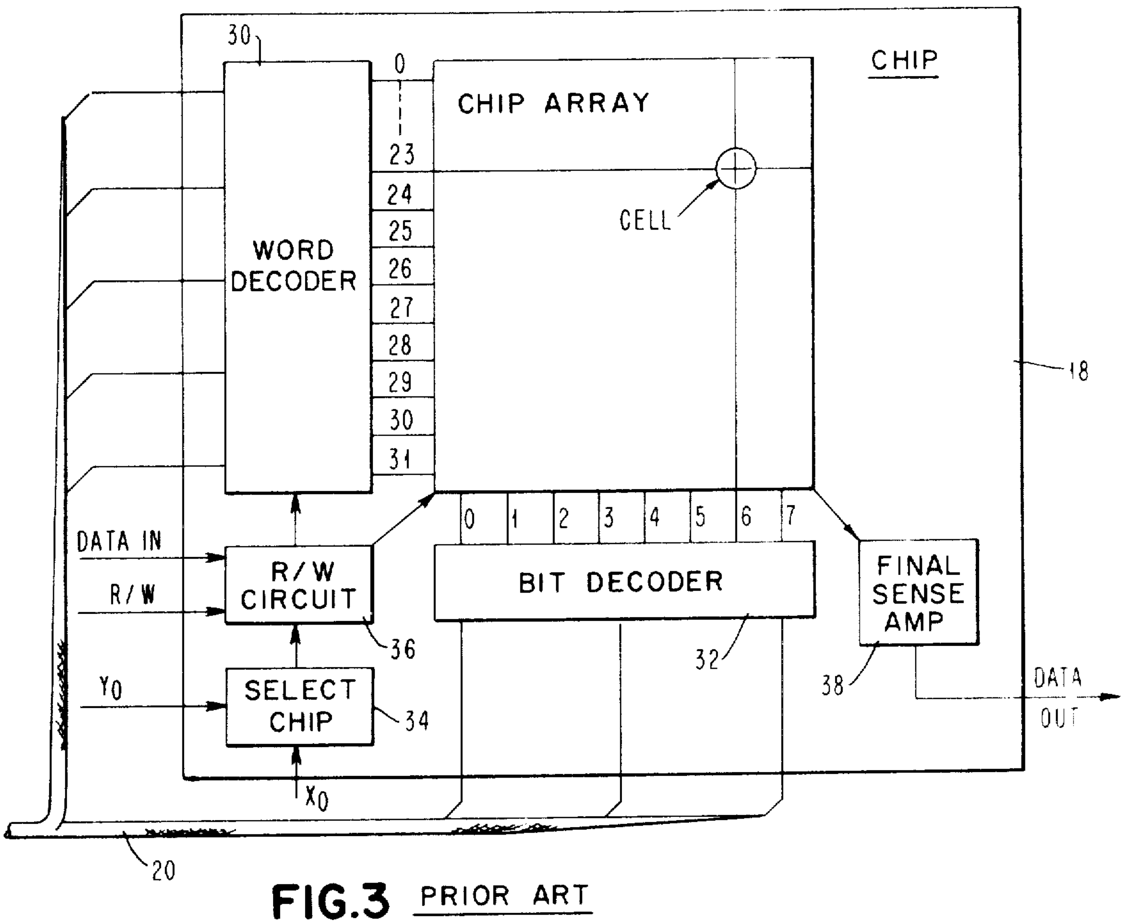
FIG. 2 is a more detailed block diagram of one chip of the memory of FIG. 1.

Referring to FIG. 2, a single chip is shown in more detail. The word decoder 30 and the bit decoder 32 decode the output 20 from the address buffer which results in the selection of a single bit from the chip at the intersection of the energized decoder output lines.

Each chip is also provided with select chip circuitry 34 responsive to the X and Y coordinate lines. When the appropriate X and Y lines are energized, the select chip logic 34 activates the read/write (R/W) circuit 36. When the R/W input of the R/W circuit is energized, the data on "Data In" line is stored in the selected memory cell in the chip array. Only that cell which is selected by the word decoder and the bit decoder is activated for storage.

Similarly, data are sensed by the final sense amplifier 38 which is connected to the array in such a manner that it responds to read data from the cell which is energized by the word decoder and the bit decoder.

The details of the chip array, decoders, write circuitry, and read circuits vary from memory-to-memory and therefore, have not been shown in detail. A typical memory in which the invention may be embodied is shown in an article entirled "A High-Performance LSI Memory System" by Richard W. Bryant et al on pages 71–77 in the July 1970 issue of Computer Design.

At this point, primarily in order to introduce terminology which will be used in the following detailed description of the invention, some additional details of the memory arrangement and the manner in which it is addressed will be described. The preferred embodiment of this memory contains a plurality of words, each of which contains 16 bits of information. In the preferred embodiment, each bit in a word is supplied by a different card, so a basic operational memory (BOM) will contain 16 array cards. Each card contains 128 array chips (32 modules), and each chip contains 256 bit cells. With 128 chips per card and 256 bits per chip, this memory will have a capacity of 32, 768 words. With 16 bits per word, the BOM will contain over half a million bits. Of course, as is well-known, several BOM's may be joined together to form a larger memory. In order to address a memory of this size, fifteen address bits are required. Seven of the address bits will specify one of the chips on a card and the remaining eight address bits will specify a cell within the chip. The 15 address bits are normally used in parallel to simultaneously address a single cell on each of the 16 cards. These 16 cells form a word.

The 15 address bits can be broken down still further. The card can be regarded as being divided into 16 logical sectors, each sector containing eight chips. In this case, four of the seven chip-address bits will define a card sector and the remaining three bits of the chip-address will select a specific chip within the sector. If we also regard each chip as being logically divided into 16 sectors, then four of the eight cell-address bits will indicate a specific chip sector and the remaining four cell-address bits will indicate a specific memory cell within the sector. In the following sections of this specification, the four bits which define a chip sector will be called A,B,C and D, where D is regarded as being the high-order bit of the chip-sector-address. The four bits which define a card-sector address will be referred to as E,F,G and H is regarded as the high-order bit of the card-sector address. Preferably, each module is comprised of four chips which are logically part of four contiguous card sectors.

Figure 3:
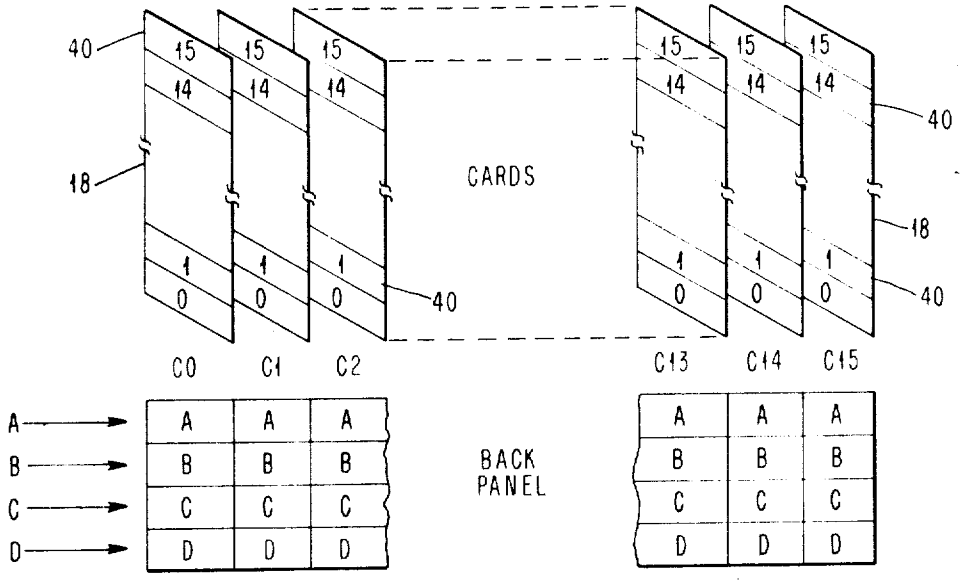
FIG. 3 PRIOR ART
FIG. 3 shows a prior art arrangement of array cards and back-panel wiring.

Referring now to FIG. 3, some additional details of a small portion of a prior art memory are shown. The top portion of FIG. 3 represents sixteen array chips 18 each of which forms a part of one of the array cards C0, C1, C2, . . . C13, C14, C15. When a word in the memory is addressed, each of these chips will supply one bit of that word. Each chip is logically divided into 16 chip sectors 40, each chip sector containing 16 bit cells. As was described above, word address bits DCBA will designate one of the 16 chip sectors, and four other address bits will designate a specific bit cell within the sector. The bottom portion of FIG. 3 indicates a portion of the standard back-panel wiring which is used to distribute addresses to each of the cards in the BOM. This portion of the figure is intended to show that the incoming chip-sector address bits DCBA are distributed unchanged to all of the cards. In general, this will be true of all of the address bits, and all of the bit cells that are addressed on the 16 cards will be substantially in physical alignment with each other.

The Invention

As has been stated above, this invention provides a method and apparatus the use of which enables construction of a reliable memory from partially defective components. When the array chips are tested after manufacture, they are sorted into three major groups: (1) perfect chips; (2) chips having one or more defects in one and only one of the 16 sectors (hereinafter referred to as "imperfect chips"); and (3) chips having at least one defect in two or more of the sixteen sectors. In this invention, both perfect and imperfect chips are utilized. The imperfect chips are further sorted into 16 groups, each group containing chips having imperfections in a common sector. In using the imperfect chips to construct an array card, in accordance with the preferred embodiments of the invention, chips having imperfections in sector 0 are used only on sector 0 of the card, chips having imperfections in sector 1 are used only in sector 1 of the card, etc. The perfect chips may be used anywhere on the card. Thus, depending upon production yields, each logical sector of an array card may have upon it one or more chips each having one or more imperfections localized within a chip sector which corresponds to the card sector. These array cards will be utilized, as described below, in constructing a BOM.

With reasonable production yields, a sizeable percentage of chips will be perfect. Perfect chips, of course, may be used anywhere on a card. An imperfect chip will often have only one, or a small number, of defective storage cells. When addressing, for example, chip-sector 0 on card-sector 0, there will be a probability (which depends upon production yields) that a perfect chip-sector is being addressed. And, even if an imperfect chip-sector is being addressed, there will be some probability that the specific memory cell being addressed is perfect. This latter probability will generally increase as chip-sector size increases. Because there is a fairly high probability that a storage cell contained in chip-sector *n* of card-sector *n* is a perfect storage cell, that cell will often be referred to herein as a "suspect" cell which contains a "suspect" bit of data. It will also be recognized that an imperfect cell is merely a cell which has failed to pass one or more quality control tests. Because of the strictness of these tests, such a cell may well function perfectly when used in a memory. Those skilled in the art will also recognize that certain chip defects (e.g., in a line or a sense amplifier) may render a perfect cell inaccessible. For purposes of this description, inaccessible cells will be regarded as being imperfect cells.

In assembling chips onto modules and placing the modules on a card, it is preferred that each module contain four chips and that the four chips be part of four logically contiguous card sectors. A module which contains chips that may have defects in chip-sectors 0, 1, 2 or 3 will be used as part of card-sectors 0, 1, 2 and 3, respectively; a module which contains chips that may have defects in chip-sectors 4, 5, 6 or 7 will be used as part of card-sectors 4, 5, 6 and 7, respectively; etc. Using this arrangement, a card may be constructed of four different types of modules thus minimizing the amount of different part numbers which are used in the manufacturing process.

Another step in the manufacture of this memory is to "skew" that portion of the back-panel address wiring which relates to the chip-sector address bits DCBA. The manner in which the back-panel wiring is skewed for each of the 16 cards is indicated in FIG. 4. Each of the columns in FIG. 4 shows the skewing of a chip-sector address that is sent to one of the cards. The letters DCBA represent the four chip-sector address bits. The notations $\overline{A}$, $\overline{B}$, $\overline{C}$ and $\overline{D}$ are intended to mean the inverse of bit A, the inverse of bit B, the inverse of bit C and the inverse of bit D, respectively. FIG. 4 is intended to show that, when chip-sector address bits are transmitted to the cards, card 0 (C0) receives these bits unchanged, C1 receives the chip-sector address bits with bit A inverted, C2 receives the bits with bit B inverted, C3 receives the bits with bits A and B inverted, . . . . C15 receives the bits with all bits inverted. Although it will be noted that the skewing arrangement shown in FIG. 4 follows a binary sequence, this need not be the case. Any skewing arrangement which presents a different combination of inverted and uninverted bits to each card may be utilized. However, some kind of sequential skewing will usually be preferred because this will simplify the circuitry which identifies a suspect bit.

In order to appreciate the significance of this skewing, one must first recall that this memory is constructed in such a manner that each chip located in a given card sector may contain an imperfection in a corresponding chip sector. For this reason, if conventional non-skewed addressing were to be used, it would be possible to address a word (for example, a word contained within chip sector 7 of card sector 7) which could contain several (or all) imperfect bit cells. However, with the skewing, each bit that is read from (or written into) the memory comes from a different chip sector. With back-panel wiring as depicted in FIG. 4, when bits DCBA reference chip sector 7, only card 0 (C0) will actually furnish a bit from sector 7 of a chip: C1, because of the inversion of bit A, will furnish a bit from sector 6 of a chip; C2, because of the inversion of bit B, will furnish a bit from sector 5 of a chip; . . . C15, because of the inversion of all bits, will furnish a bit from sector 8 of a chip. The skewed wiring thus ensures that any word which is accessed from the memory will contain no more than one suspect bit.

In order to provide a further appreciation for the effect of the skewing of the chip-sector addresses, reference is now made to FIG. 5. FIG. 5 is associated with FIG. 4 in the same manner that the top and bottom portions of FIG. 3 were associated. Each of the columns of FIG. 5 represents one array chip. Although the chips are not shown in perspective (as are the chips in the top portion of FIG. 3), it will be recognized that these chips generally form a stack within the memory. Each chip is divided into 16 logical sectors, numbered 0–15. Along the left-hand side of the drawing, are shown the 16 possible configurations of the chip-sector address bits DCBA. The entries within FIG. 5 may be regarded as a translation table, or truth table, which shows exactly how the skewed wiring depicted in FIG. 4 will distribute chip-sector addresses to the various cards. For example, a reference to chip sector 10 (DCBA is 1010) will cause a bit to be selected from sector 10 of a chip on card 0 (C0), a bit to be selected from sector 11 of a chip on C1, a bit to be selected from sector 8 of a chip of C2, etc. Again, the significant point is that, no matter what chip-sector address is received into the address register, each card will supply a bit from a different chip sector.

A memory constructed in accordance with the above, wherein each word may contain a reference to an imperfect bit cell, may still be reliable because each word address uniquely identifies the imperfect bit. In accordance with the preferred embodiments of the invention, this identification is accomplished in one simple step by Exclusive-ORing the chip-sector address bits DCBA which were received from the address bus with the card-sector address bits HGFE also received from the address bus. The result of the Exclusive-OR operation will be the location within the word of the bit which was read from (or written into) a suspect cell.

FIG. 5, besides being illustrative of a portion of this memory, can be regarded as a truth table which illustrates the above-described Exclusive-OR operation. When using FIG. 5 as a truth table, the configurations for chip-sector address bits DCBA shown on the left-hand side retain the meaning previously ascribed to them. However, the designations C0 through C15 appearing at the bottom of the columns of FIG. 5 must now be interpreted as representing the card-sector address bits HGFE. Although these address bits are represented in FIG. 5 as decimal digits, the equivalent chip-sector representation is well-known and need not be described herein. As an example, let us assume that the address received from the address bus indicates a reference to card sector 12 (HGFE is 1100) and a reference to chip-sector 7 (DCBA is 0111). Column C12 and line 0111 of FIG. 5 intersect at a box containing the number "11" (1011 in binary). The binary number 1011 is the Exclusive-OR of the binary numbers 1100 and 0111 and therefore tells us that, for this particular word, bit 11 came from an imperfect chip sector. In order to verify the correctness of this result, one may again refer to FIG. 5, this time interpreting the designations C0 through C15 as they were originally presented: that is, as referring to cards 0–15. Since, for this example, the chip-sector address was given as 0111, we must look at that row of FIG. 5. The result of the Exclusive-OR operation told us that bit 11 was the imperfect bit (and we known that this memory normally operates in such a manner that bit 11 would be derived from card 11) we must locate the intersection between row 0111 and column C11. The number "12" is found at this intersection. The number 12 tells us that, for the word in question, bit 11 (from card 11) was accessed: from sector 12 of a chip on card 11. Since this example stated that the word was addressed from card-sector 12, and because this memory was built in such a manner that chips with imperfections in chip-sector 12 were always placed on card-sector 12, the fact that bit 11 of the exemplary word was drawn from chip-sector 12 of a chip of card-sector 12 establishes the correctness of the Exclusive-OR technique Of identifying the imperfect bit.

Substantially all of the preceding description is applicable to both of the embodiments described herein. The remainder of the description will be separately treated below for each embodiment.

Least Cost System

Figure 6:
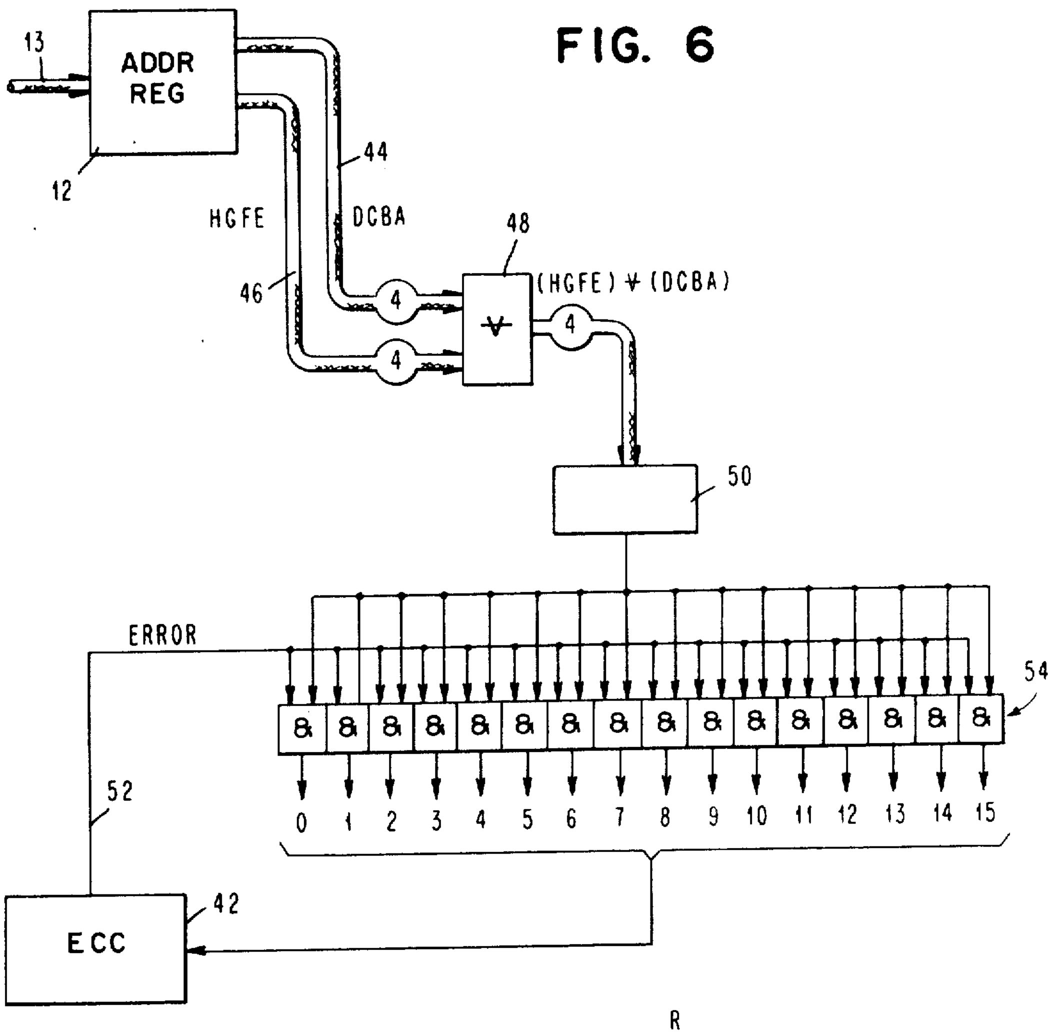
FIG. 6 shows circuitry used in implementing a first embodiment of the invention.

FIG. 6 shows additional elements that are added to a memory system in the preferred embodiment of a simple, economical implementation of this invention. As was described above, under the heading Environment of the Invention, the memory system includes an address bus 13 which feeds the address register 12. It is further assumed that the memory system which is being modified in accordance with this invention already contains some form of error detection circuitry 42. Implementation of this invention will normally require minor modifications to the existing error detection circuits. The address register 12 feeds chip-sector address bits DCBA via line 44 and card-sector address bits HGFE via line 46 to an Exclusive-OR circuit 48, the output of which is fed to a register 50 for retention in the event that error correction becomes necessary. Upon detection of an error in data in the memory data register (not shown) the error detecting circuitry 42 will generate a signal on error line 52 which signal is fed to each of a group of 16 AND circuits 54. Each of the AND circuits 54 has inputs connected to the output of register 50 and each AND circuit is so designed as to produce an output signal when it senses the concurrence of an error signal and an output from register 50 having a binary value corresponding to the position of the particular AND circuit within the group of 16. The output signal generated by one of the AND circuits 54 is transmitted to the error correcting circuitry 42 so that it may be utilized to invert the bit identified thereby.

Various techniques for implementing error correction circuitry that will accomplish the function of inverting a specifically identified bit are well-known. One example of such circuitry is shoWn in the Sakalay U.S. Pat. No. 3,245,049 issued Apr. 5, 1966 which is hereby incorporated by reference into this specification.

Although the various kinds of error correction circuitry which may be used to advantage in the embodiment of FIG. 6 are too well-known to require detailed description herein, the type of error detection and/or correction circuitry utilized will have a significant effect upon the advantages which may be realized by the use of this embodiment of the invention. For example, if the memory system contains only parity circuits, then this embodiment of the invention will, upon indication of a parity error, always invert the bit identified by the contents of register 50 and then continue processing under the assumption that the data is now correct. If the parity failure had been caused by an error in some other bit position, the "correction" would actually introduce a second error. Although this apparent disadvantage may not be of great significance because of the high reliability of the perfect portions of the monolithic memory, this embodiment of the invention will preferably be used in a memory system wherein the error detection circuitry is of a type which can correct any single error occurring in a data word and can detect any two errors which occur in a single data word. In such a system, it will generally be preferable to allow the error correction circuitry 42 to correct, on its own, any single errors which might occur. In the event that the error detection circuitry 42 were to detect the occurrence of a double error, it would then produce a signal on error line 52 which, in conjunction with the contents of register 50 would enable one of the AND circuits 54 to generate a signal indicating the location of the imperfect bit. The error correction circuitry 42 would then invert this imperfect bit and again examine the data word to see if the presence of a single (correctable) error were indicated. If such were to be the case, the error correcting circuitry 42 would correct the single error in its normal manner and procesSing would continue. With the use of single-error-correction double-error-detection circuitry, there will be only an extremely remote possibility that this embodiment of the invention might permit erroneous data to pass undetected or improperly corrected. Again, details of specific implementations of such circuitry are well-known and do not require further description herein.

It is worth noting that, in this first preferred embodiment of the invention, no delay or impediment to the normal operation of the computer will be introduced unless an error occurs. It should also be noted that, despite the use of imperfect chips, the majority of words in the memory will contain no errors.

Fastest Most Reliable Embodiment

In accordance with a second preferred embodiment, this invention may be implemented in such a manner that the performance of the memory System suffers no degradation in speed or reliability. Briefly, this embodiment comprises an additional array card, preferably manufactured entirely from perfect chips. When writing into the memory, a data bit that would normally be written into a cell in a chip sector that has been denoted as being imperfect will be written into a bit cell on the perfect array card. When reading from the memory, this bit from the perfect array card will be gated to the appropriate location in the memory data register in place of the bit which would have been read from an imperfect chip sector.

Figure 7A:
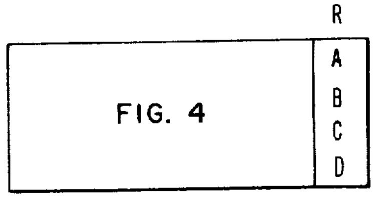
FIG. 7 shows back-panel wiring and card array changes utilized in a second embodiment of the invention.

FIG. 7 shows the modifications that are made to FIGS. 4 and 5 in implementing this second embodiment. As is shown in FIG. 7*a*, additional back-panel wiring is required to provide addresses to the redundant card. As before, only the back-panel wiring for chip-sector address bits DCBA is shown. (The remainder of the back-panel address wiring is completely straightforward and need not be described herein.) Although FIG. 7*a* shows this wiring to be unskewed, any convenient skewing may be utilized if desired.

Figure 7B:
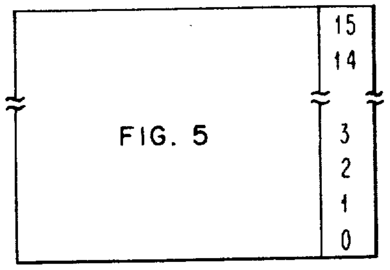

As shown in FIG. 7*b*, each chip-sector on the redundant car will be addressed without any skewing by the back-panel wiring depicted in FIG. 7*a*.

This second embodiment is similar to the first embodiment (see FIG. 6) to the extent that it also requires an Exclusive-OR circuit 48 which is fed by a bus 44 carrying the chip-sector address bits DCBA and a bus 46 carrying the card-sector address bit HGFE, and some means 50 for retaining an indication of the output of Exclusive-OR circuit 48.

Figure 8:
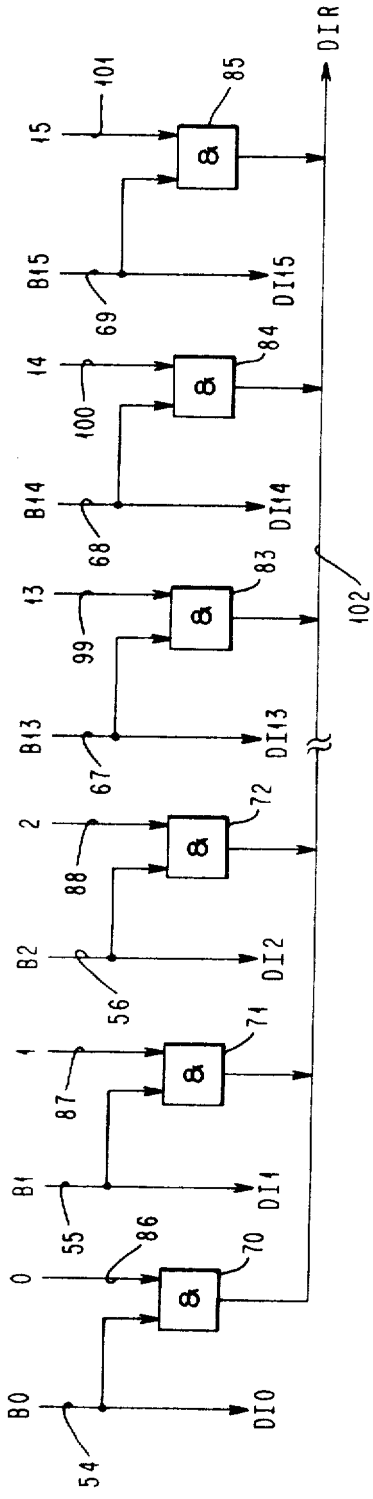
FIG. 8 shows additional memory write circuitry used in the second embodiment.

Referring now to FIG. 8, the few additions to the memory system that are used when writing into the memory in accordance with this embodiment are shown. The 16 data bits B0–B15 are received on lines 54–69 and are directed to Data In lines DI0–DI15 on each card as has been previously described with respect to FIG. 2. Each data bit input line also serves as one input to an associated AND circuit. For the sixteen data bit input lines, there are sixteen associated AND circuits 70–85. Each of the AND circuits 70–85 receives its additional inputs via lines 86–101 from register 50 (FIG. 6) in exactly the same manner as did the AND circuits 54 shown in FIG. 6. The outputs of all of the AND circuits 70–85 are OR'ed together on line 102 which feeds the Data In line DIR of the redundant card. Thus, the identification contained within register 50 (FIG. 6) of the utilization of an imperfect chip-sector will cause one of the lines 86–101 to enable one of the AND circuits 70–85 to write the data bit which was directed to an imperfect chip sector into a cell on the redundant card. There is no need to inhibit the attempt, via one of the Data In lines DI0–DI115, to write into the imperfect chip-sector.

Figure 9:
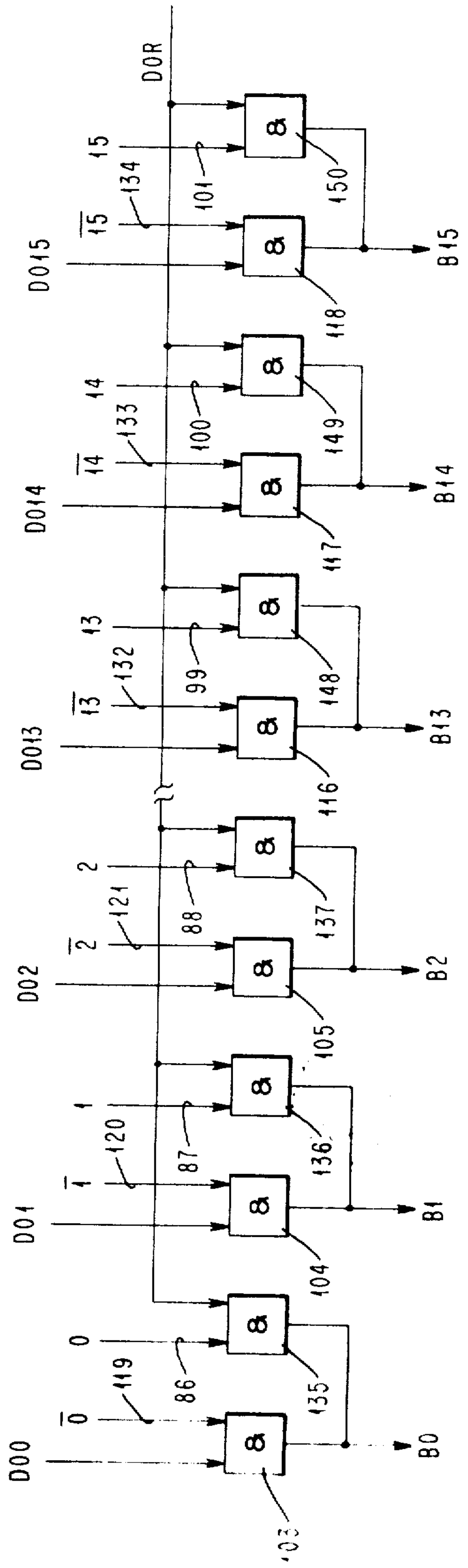
FIG. 9 shows additional memory read circuitry used in the second embodiment.

As is shown in FIG. 9, readout from the memory is accomplished in a similar manner. When reading, a bit is received from each card via the Data Out lines DO0–DO15 and a data bit is received from the redundant card via its Data Out line DOR. Each of the sixteen Data Out lines DO0–DO15 supplies one input to an associated AND circuit 103–118. Additional inputs to each of the AND circuits 103–118 are supplied via lines 119–134, the signals on said lines being derived from the register 50 (FIG. 6) which indicates the location of the bit which is being read from an imperfect chip-sector. Line 119 will enable AND 103 when bit position 0 does not contain the imperfect bit, line 120 will enable AND 104 when bit position 1 does not contain the imperfect bit, line 121 will enable AND 105 when bit position 2 does not contain the imperfect bit . . . , line 132 will enable AND 116 when bit position 13 does not contain the imperfect bit, line 133 will enable AND 117 when bit position 14 does not contain the imperfect bit, and line 134 will enable AND 118 when bit position 15 does not contain the imperfect bit. Finally, the Data Out line DOR from the redundant card furnishes one input to each of sixteen AND circuits 135–150. Each of the AND circuits 135–150 receives additional inputs via lines 86–101 from register 50 (FIG. 6). The binary number contained within register 50 will cause one of the lines 86–101 to enable its associated AND circuit, thereby causing the data bit read from the redundant array card on Data Out line DOR to pass via one of the bit output lines B0–B15 to the proper location in the memory data register (not shown) in place of the bit being read from an imperfect chip-sector.

Because each word that is written into or read from the memory in this second embodiment utilizes 16 perfect bit cells, it can introduce no degradation of the reliability of the memory system. So far as any error detection and/or correction circuitry that may exist in the system is concerned, the system will function exactly as would a memory constructed entirely of perfect chips and which did not contain this invention. Although this embodiment of the invention introduces additional levels of logic, primarily when reading data from the memory (as shown in FIG. 9, a first level comprises AND circuits 103–118 and 135–150, and a second level comprises the OR'ing of the outputs of AND pairs 103 and 135, 104 and 136, etc. ), these generally will not have a significant effect upon the memory speed because (1) of the parallelism of the memory system and (2) this circuitry may be imbedded within (i.e., shared by) the ECC already in the memory system.

Although this second embodiment is more expensive to produce (an extra card is required) its increased reliability will make it the preferred choice in many applications.

ADDITIONAL EMBODIMENTS

In both of the preferred embodiments described above, the number of groups into which imperfect chips were sorted was selected as being equal to the number of bits in a word. Brief descriptions are presented below of two alternative embodiments wherein the number of sorted groups of imperfect chips is not equal to the number of bits in a word.

Consider first the situation where each memory word contains 17 bits — 16 data bits plus one word parity bit, and where the imperfect array chips are sorted into eight separate groupsings. When using an 8-way sort, it will be preferable to regard each chip as having eight logical chip-sectors addressed by chip-sector address bits CBA and to regard each card as having eight logical card-sectors addressed by card-sector address bits HGF. (For purposes of both of these examples, it is assumed that the chip size and card size are as was described above.) In order to attain a memory with maximum reliability, assume an implementation in accordance with the second preferred embodiment. A perfect redundant array card R1 will be associated with the first eight imperfect array cards C0–C7 of the memory; a second perfect redundant array card R2 will be associated with the next eight imperfect array cards C8–C15 of the memory; and a third perfect array card will be used for the seventeenth memory data card C16. FIG. 10, in conjunction with the previous descriptions of FIGS. 4, 5, 8 and 9, present sufficient information to describe how such a memory may be constructed. Note that cards C0–C7 and R1 make up a system which is a smaller version of that which was described with respect to FIGS. 8 and 9, as do the group of cards C8–C15 and R2. The seventeenth data card C16 is written onto and read from in the same manner as it would be if used in a memory which does not include this invention.

Now consider the situation wherein this invention is used in a memory and, in the production process, the imperfect chips are sorted into a larger number of groups than there are bits in a data word. For example, consider a memory which has six bits per word and assume that, in the production process, imperfect chips are sorted into eight groups. With the 8-way sort, each chip is regarded as having eight logical chip-sectors which are addressed by chip-sector address bits CBA, and each card will also be regarded as having eight logical sectors each of which is addressed by card-sector address bits HGF. Again, it will generally be preferable to use the embodiment of this invention which utilizes a redundant array card. However, in this example the total number of cards, including the redundant card, does not exceed the number of groups into which imperfect chips have been sorted. For this reason, the redundant array card may also be an imperfect card that is indentical to the data cards. Of course, it too must now have its chip-sector address wiring skewed with respect to the other cards. FIG. 11, when taken in conjunction with descriptions provided hereinbefore, provides sufficient information to construct such a memory. It will be noted that several of the entries contained in the matrix that forms the upper portion of FIG. 11 have been circled. This has been done to highlight the fact that those entries, when FIG. 11 is interpreted as a truth table which designates the location within a word of an imperfect bit, refer to a non-existent seventh (bit 6) or eight (bit 7) data bit. Actually, references to bit 6 indicate that an imperfect chip-sector is being addressed on the redundant card R. References to bit 7 are, in effect, references to a bit on a card which is non-existent in the memory shown in FIG. 11. (That is, the selected is comprised of bits from only perfect cell locations.) Yet another aspect of the memory system described by FIG. 11 is worthy of mention. Because the total number of cards (including the redundant card) in the array is less than the number of groups into which imperfect chips have been sorted, this memory would function in a completely satisfactory manner even if one of the cards contained chips having two imperfect sectors. For example, in the embodiment shown in FIG. 11, the redundant array card R could be constructed in such a manner that card-sectors 0 and 1 each contained chips having imperfections in chip-sectors 0 and 1; card sectors 2 and 3 could contain chips having imperfections in chip-sectors 2 and 3; card sectors 4 and 5 could both contain chips having imperfections in chip-sectors 4 and 5; and card-sectors 6 and 7 could both contain chips having imperfections in chip sectors 6 and 7. Although the use of such a card may be desirable in cergain circumstances, this generally would not be a preferred implementation.

The number of groups into which imperfect chips are sorted will depend upon various factors that are primarily of an economic nature. Those skilled in the art will recognize that, in order to fascilitate addressing, the imperfect chips should preferably be sorted into a number of groups that is a power of two. Also, it will generally be best to sort the chips into a number of groups that is reasonably close to the number of bits in a data word. If the number of chip groupings is smaller than the number of bits in a word, a few perfect array cards may be utilized. If the number of chip groupings exceeds the number of bits in a data word, it may be possible to construct both of the preferred embodiments described above entirely of imperfect cards, and/or it may be possible to construct the memory using some chips which have imperfections in more than one chip-sector.

Those skilled in the art will recognize that this invention can be utilized in a memory system having a plurality of BOM's wherein one or more of the BOM's are constructed entirely from perfect chips. It will also be recognized that this invention can readily be used in conjunction with other memory production techniques, such as those described in the patent and applications that have been incorporated by reference into this specification.

Another point which will be recognized by those skilled in the art is that this invention need not be limited to a memory wherein each bit in a word is supplied by a different array card or a different array chip. The techniques described herein could well be applied to memory systems wherein a single card or chip provides more than one bit for a given word.

Yet another variation of this invention which will be apparent to those skilled in the art concerns the address skewing. Although the descriptions appearing hereinbefore specifically taught the skewing of chip-sector addresses, the system would have functioned just as well if, for example, the skewing technique had instead been applied to the card-sector addresses. The significant point of the address skewing is that each word, or defined group of bits within a word, contains only one bit that is derived from a suspect cell.

While the invention has been particularly shown and described with reference to preferred embodiments thereof, it will be understood by those skilled in the art that the foregoing and other changes in form and details may be made therein without departing from the spirit and scope of the invention.

What is claimed is:

1. For use in a monolithic memory which contains addressing means for addressing memory cells contained in array chips, a plurality of storage array chips arranged on a storage array card; wherein at least one of said chips contains an imperfect memory cell within a known logical chip-sector of said chip; and said one of said chips is located in said memory in a logical card-sector the address of which is related in a predetermined manner to the address of said logical chip-sector;

said memory also containing indicating means associated with said addressing means for indicating the location within a memory word of a data bit associated with said imperfect memory cell.

2. A monolithic memory comprising a plurality of storage array chips arranged on a plurality of storage array cards and addressing means for addressing words consisting of data stored in a plurality of cells contained in said chips; wherein at least one of said chips contains an imperfect memory cell within a known logical chip-sector of said chip; and said one of said chips is located in said memory in a logical card-sector the address of which is related in a predetermined way to the address of said logical chip-sector;

said memory also containing indicating means associated with said addressing means for indicating the location within a memory word of a suspect data bit that is associated with said known chip-sector.

3. The monolithic memory of claim 2 wherein said indicating means comprises:

means for logically combining two portions of an address of a memory word, the result of said logical combination being a representation of the location within said memory word of said suspect data bit.

4. The monolithic memory of claim 2 further comprising:

error detection means for generating an error signal when a data word read from memory contains a given type of error; and error correction means responsive jointly to said indicating means and to said error signal to invert said suspect bit.

5. The monolithic memory of claim 2 further comprising:

additional storage array chips, containing additional storage cells, arranged on one or more storage array cards; and selection means jointly responsive to said address means and to said indicating means for addressing one of said additional storage cells.

6. The monolithic memory of claim 5 wherein said selection means, during a memory write operation, causes the data bit which would be written into said known chip-sector to be written into said one of said additional storage cells; and said selection means, during a memory read operation, causes a data bit to be read from said one of said additional storage cells.

7. A monolithic memory comprising a plurality of storage array cards, each of said cards containing *m* addressable card-sectors, each of said card-sectors containing one or more storage array chips, each of said chips containing *m* addressable chip-sectors, each of said chip-sectors containing a plurality of memory cells; and word-addressing means for addressing words stored within said memory, each word comprising *n* bits of data stored in *n* memory cells, said word-addressing means causing, for each word addressed by the system, substantially simultaneous access to all of the n memory cells associated with a given word-address, each word address containing within it a card-sector-address and a chip-sector-address; wherein at least one of said chips contains at least one imperfect memory cell in its $i^{th}$ chip-sector, each bit of data stored in said $i^{th}$ chip-sector being regarded as a suspect bit;

said one of said chips is located in a predetermined card-sector of one of said cards, the address of said card-sector being related in a predetermined manner to the address of said $i^{th}$ chip-sector;

said word-addressing means is so arranged that, for each word addressed in said memory, no more than one data bit within a predefined group of data bits within said word will be a suspect bit;

said memory also including indicating means responsive to the address of a word to generate a signal representative of the location within said predefined group of said suspect bit.

8. A monolithic memory comprising a plurality of storage array cards, each of said cards containing *m* addressable card-sectors, each of said card-sectors containing one or more storage array chips, each of said chips containing *m* addressable chip-sectors, each of said chip-sectors containing a plurality of memory cells; and word-addressing means for addressing words stored within said memory, each word comprising *n* bits of data stored in *n* memory cells, said word-addressing means causing, for each word addressed by the system, substantially simultaneous access to all of the *n* memory cells associated with a given word-address, each word address containing within it a card-sector-address and a chip-sector-address; wherein:

a plurality of said chips each contains at least one imperfect memory cell in one imperfect chip-sector, all of its remaining chip sectors being perfect, each bit of data stored in one of said imperfect chip-sectors being regarded as a suspect bit, and each memory cell within an imperfect chip-sector being regarded as a suspect cell;

all chips that are located in the $i^{th}$ card-sector of any of said cards have no known imperfect memory cells in chip-sectors other than the $i^{th}$ chip-sector;

said word-addressing means is so arranged that, for each word addressed in said memory, no more than one memory cell within a predefined group of memory cells within the *n* memory cells associated with the addressed word will be a suspect cell;

said memory also includes indicating means responsive to the address of a word to generate a signal representative of the location of a suspect bit within said word.

9. The monolithic memory of claim 8 wherein said indicating means comprises:

means for logically combining two portions of an address of a memory word, the result of said logical combination indicating which of the bits within said word is the suspect bit.

10. The monolithic memory of claim 8 wherein said word-addressing means comprises:

means, associated with each array card that contains a memory cell that is within said predefined group, for providing skewed chip-sector-addresses in such a manner that no two memory cells within said predefined group will have the same chip-sector-address.

11. The monolithic memory of claim 8 wherein said word-addressing means comprises means, associated with each array card that contains a memory cell that is within said predefined group, for providing skewed addresses for one of said sectors in such a manner that no two memory cells within said predefined group will have both the same chip-sector-address and the same card-sector-address.

12. The monolithic memory of claim 11 wherein said indicating means comprises:

means for logically combining the chip-sector-address portion and the card-sector-address portion of a word-address, the result of said logical combination indicating which of the bits within said word is a suspect bit.

13. The monolithic memory of claim 8 further comprising:

error detection means for generating an error signal when a data word read from memory contains a given type of error; and error correction means responsive jointly to said indicating means and to said error signal to invert the bit that was read from a suspect cell within said predefined group.

14. The monolithic memory of claim 8 further comprising:

an additional storage array card comprising additional storage cells; and selection means jointly responsive to said word-addressing means and to said indicating means for addressing one of said additional storage cells.

15. The monolithic memory of claim 14 wherein said selection means, during a memory write operation, causes the data bit that is being written into a suspect cell of said predefined group to be written into said one of said additional storage cells; and said selection means, during a memory read operation, causes a bit stored in said one of said additional storage cells to be read out in place of a bit stored in a suspect cell of said predefined group.

16. A monolithic memory comprising a plurality of storage array units and addressing means for addressing words consisting of data stored in a plurality of cells contained in said units; wherein at least one of said units contains an imperfect memory cell within a known logical unit-sector of said unit; and said one of said units is located in a logical portion of said memory in such a manner that the address of said logical portion is related in a predetermined way to the address of said logical unit-sector;

said memory also containing indicating means associated with said addressing means for indicatng the location within a memory word of a suspect data bit that is associated with said known unit-sector.

17. The monolithic memory of claim 16 wherein said addressing means comprises:

means, associated with each array unit that contains a cell within a predefined group, for providing skewed unit-sector-addresses in such a manner that no more than one cell within said predefined group will have the same unit-sector-address.

* * * * *